US007997786B2

(12) United States Patent  
Liu

(10) Patent No.: US 7,997,786 B2  
(45) Date of Patent: Aug. 16, 2011

(54) HEATING AND COOLING CUP

(75) Inventor: Pei-Chuan Liu, Taipei (TW)

(73) Assignees: Pei-Chuan Liu, Taipei (TW);  
Teck-Huat Chua, Singapore (SG)

( * ) Notice: Subject to any disclaimer, the term of this patent is extended or adjusted under 35 U.S.C. 154(b) by 632 days.

(21) Appl. No.: 12/178,701

(22) Filed: Jul. 24, 2008

(65) Prior Publication Data  
US 2010/0018982 A1 Jan. 28, 2010

(51) Int. Cl.  
*B01F 9/10* (2006.01)  
*B01F 15/06* (2006.01)  
*F25B 21/02* (2006.01)  
*F27D 11/00* (2006.01)

(52) U.S. Cl. .......... 366/44; 366/314; 62/3.62; 62/457.9; 219/438

(58) Field of Classification Search ............ 366/144, 366/145, 146, 147, 314; 62/3.62, 457.9; 219/438  
See application file for complete search history.

(56) References Cited

U.S. PATENT DOCUMENTS

| | | | | |
|---|---|---|---|---|
| 2,070,545 A * | 2/1937 | Gilbert | ........... | 366/164.6 |
| 2,282,866 A * | 5/1942 | Hagen | ........... | 366/205 |
| 2,991,628 A * | 7/1961 | Tuck | ........... | 62/3.62 |
| 3,310,953 A * | 3/1967 | Rait | ........... | 62/3.62 |
| 3,402,561 A * | 9/1968 | Mahoney | ........... | 62/3.62 |
| 3,695,586 A * | 10/1972 | Griffin | ........... | 366/144 |
| 3,839,876 A * | 10/1974 | Privas | ........... | 62/3.62 |
| 3,952,538 A * | 4/1976 | Warlick | ........... | 62/342 |
| 4,365,143 A * | 12/1982 | Kerber, Jr. | ........... | 219/401 |
| 4,801,782 A * | 1/1989 | Ineson | ........... | 219/438 |
| 5,042,258 A * | 8/1991 | Sundhar | ........... | 62/3.2 |
| 5,639,161 A * | 6/1997 | Sirianni | ........... | 366/314 |
| 5,855,431 A * | 1/1999 | Costanzo | ........... | 366/199 |
| 5,882,113 A * | 3/1999 | Binder | ........... | 366/146 |
| 5,911,504 A * | 6/1999 | Schindlegger, Jr. | ........... | 366/197 |
| 5,970,847 A * | 10/1999 | Saltzman | ........... | 99/287 |
| 6,000,224 A * | 12/1999 | Foye | ........... | 62/3.2 |
| 6,121,585 A * | 9/2000 | Dam | ........... | 219/438 |
| 6,141,969 A * | 11/2000 | Launchbury et al. | ........... | 62/3.2 |
| 6,283,625 B2 * | 9/2001 | Frankel et al. | ........... | 366/146 |
| 6,417,498 B1 * | 7/2002 | Shields et al. | ........... | 219/521 |
| 6,530,232 B1 * | 3/2003 | Kitchens | ........... | 62/3.3 |
| 6,591,615 B1 * | 7/2003 | Luo | ........... | 62/3.7 |
| 7,089,749 B1 * | 8/2006 | Schafer | ........... | 62/3.2 |
| 7,364,348 B1 * | 4/2008 | Jones | ........... | 366/130 |
| 7,780,337 B2 * | 8/2010 | Peng | ........... | 366/144 |
| 7,878,702 B2 * | 2/2011 | Peng | ........... | 366/145 |
| 2001/0002891 A1 * | 6/2001 | Frankel et al. | ........... | 366/146 |
| 2004/0140304 A1 * | 7/2004 | Leyendecker | ........... | 219/386 |
| 2004/0217102 A1 * | 11/2004 | Berger | ........... | 219/386 |
| 2006/0198241 A1 * | 9/2006 | Krishnachaitanya et al. | | 366/205 |
| 2010/0018982 A1 * | 1/2010 | Liu | ........... | 220/592.17 |

* cited by examiner

Primary Examiner — Tony G Soohoo  
(74) Attorney, Agent, or Firm — Rabin & Berdo, P.C.

(57) ABSTRACT

A heating and cooling cup includes a cup body, a stirring device, a heating and cooling chip, and a heat sink module. A heat conductive block is disposed under the cup body, the heat conductive block abuts against the heating and cooling chip, the stirring device has a stirring rod disposed in the cup body, and a bottom surface of the heating and cooling chip abuts against a heat conductive block of the heat sink module. A temperature of the cup body is changed through the heating and cooling chip, for cooling or heating liquid food in the cup body, and the liquid food is forced to generate convection through the stirring rod for accelerating a temperature variation process.

6 Claims, 4 Drawing Sheets

HEATING AND COOLING CUP

BACKGROUND OF THE INVENTION

1. Field of Invention

The present invention relates to a heating and cooling cup that can be carried and used outdoors conveniently, and more particularly to a cup body having a heating and cooling chip capable of cooling or heating and a stirring device, for heating or cooling liquid food in the cup body at a higher speed.

2. Related Art

The conventional heating and cooling chip, also called the thermoelectric cooling chip, uses semi-conductive materials having thermoelectric energy conversion characteristics. When power is applied on the chip, heat release or heat absorption will occur for cooling or heating. This effect is found by a French named Peltier, so it is called the Peltier effect.

From the end of 1950s, as the semi-conductive materials with fine thermoelectric performance have been developed rapidly, people attach more importance to the temperature changing technique having advantages of no pollution, no noise, small volume, long life, and light weight. Therefore, the materials are applied in different fields such as water dispensers, refrigerators, CPU heat sinks of computers, and air conditioner. The most important feature of the technique is that it is possible to achieve the two different objectives of cooling and heating by changing the current direction.

However, when the heating and cooling chip is used, one side abuts against a surface of the object (a contact surface), and the other side must abut against a heat sink module (a heat dissipation surface). This is because during cooling or heating, if the temperature difference between the contact surface and the heat dissipation surface is too large, the cooling or heating effect will be lowered. However, for most of the heat sink modules, after a period of time of using, the accumulated dust will affect the heat dissipation efficiency, so the heat sink modules need to be disassembled for cleansing frequently, which is quite inconvenient. Further, for example, for a heating and cooling cup, during cooling or heating, the temperature change of the liquid food in the cup starts from the lower part, and convection occurs in the liquid food because of the temperature difference. Thus, the liquid food can be cooled or heated slowly, and the temperature difference in the liquid food will result in the discomfort when the liquid food is drunk. Therefore, modification is required.

SUMMARY OF THE INVENTION

The present invention is directed to providing a heating and cooling cup that is convenient to use. The heating and cooling cup at least includes a cup body, a stirring device, a heating and cooling chip, and a heat sink module. A heat conductive block is disposed under the cup body in a protruding manner. The stirring device has a motor and a stirring rod, and the stirring rod extends into the cup body. The heat conductive block under the cup body abuts against the heating and cooling chip, for conducting the heat out of (cooling) or into (heating) the cup body. The heat sink module has a heat conductive block, a heat sink fin, and a heat sink fan. The heat conductive block is wrapped by the heat sink fin, the heat sink fan is disposed under the heat sink fin, and a bottom surface of the heating and cooling chip abuts against the heat conductive block.

To sum up, in the present invention, the heating and cooling chip conducts the heat out of or into the cup body through the heat conductive block, for achieving the objective of cooling or heating, so as to cool or heat liquid food in the cup body. Further, in the stirring device of the present invention, the stirring rod forces the liquid food in the cup body to generate convection to accelerate the cooling or heating process.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the examiners clearly understand the content of the present invention, the description with the accompanying drawings is given as follows.

Figure 1:
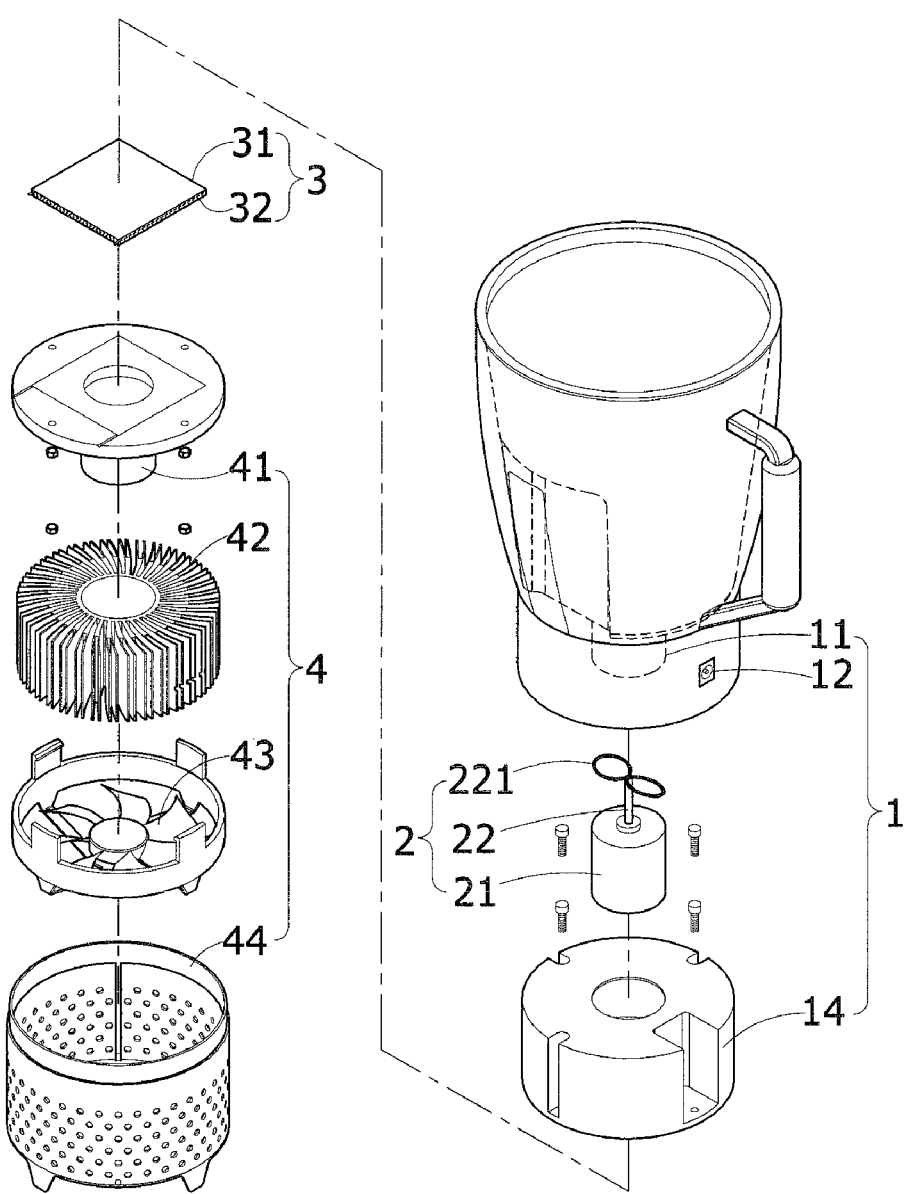
FIG. 1 is an exploded stereogram of a preferred embodiment of the present invention.
Figure 2:
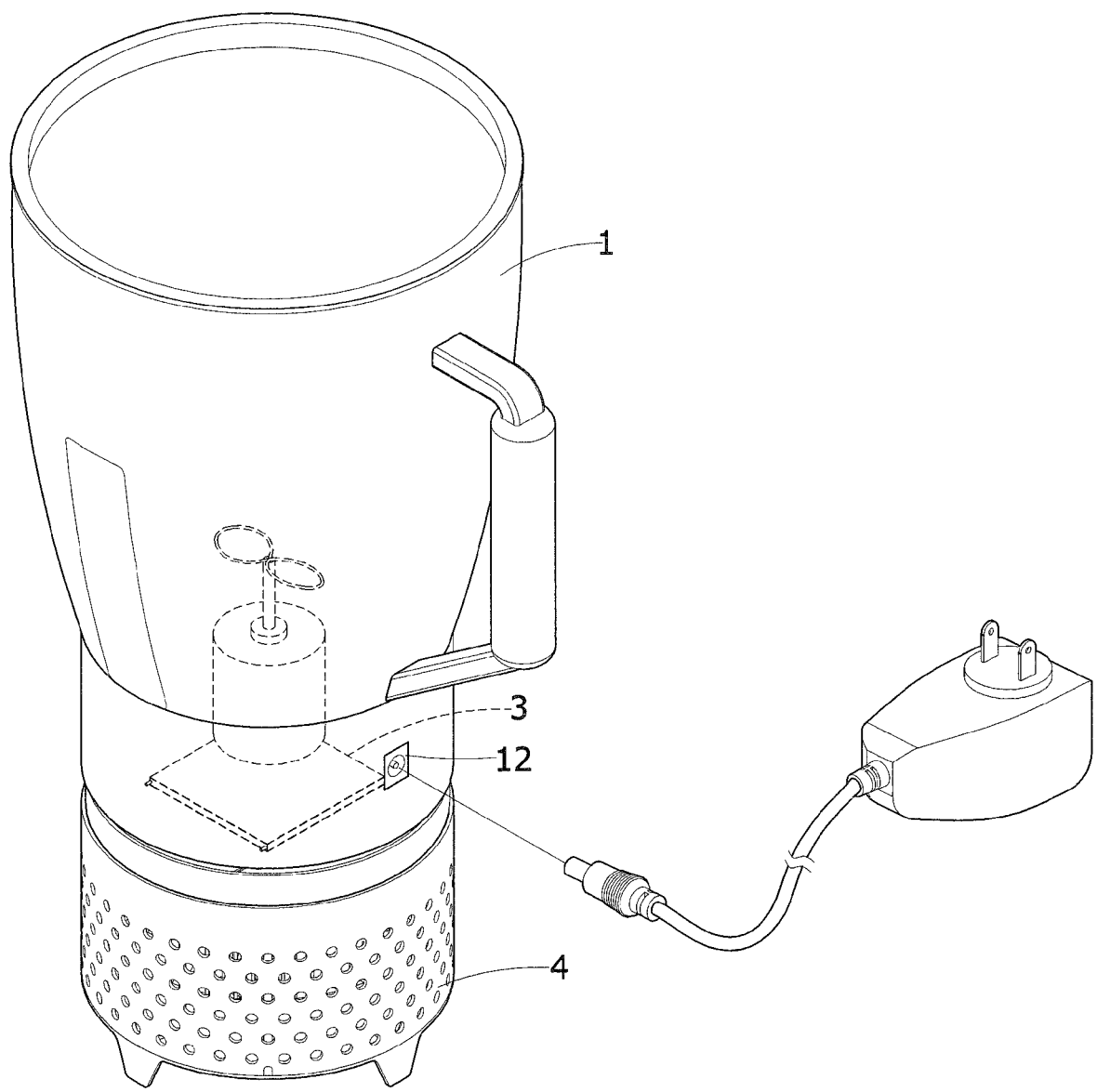
FIG. 2 is a schematic combined view of the preferred embodiment of the present invention.
Figure 3:
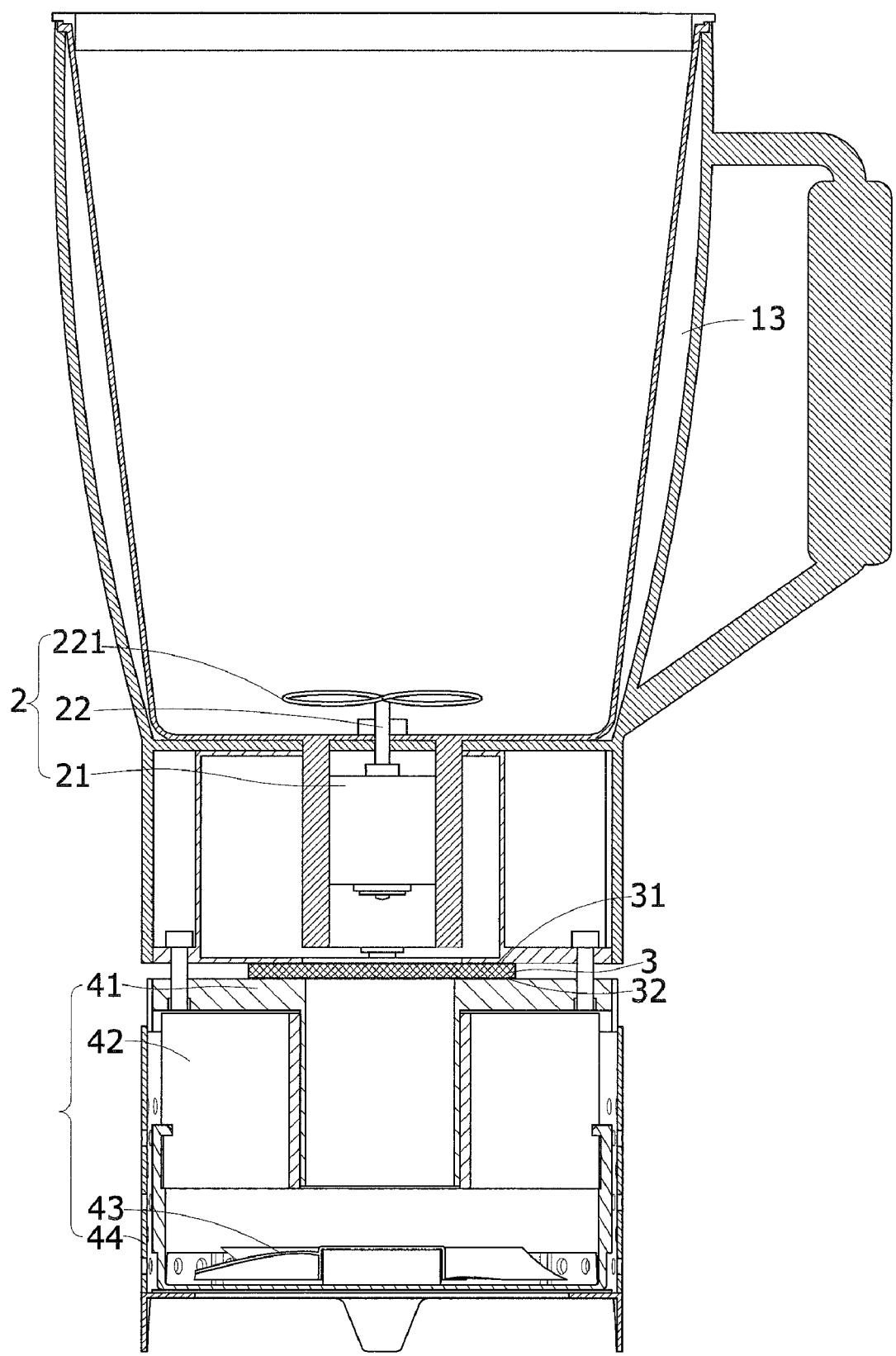
FIG. 3 is a combined sectional view of the preferred embodiment of the present invention.

Referring to FIGS. 1 to 3, the present invention at least includes the following elements.

A cup body 1 exists. A heat conductive block 11 is disposed under the cup body 1 in a protruding manner. A power jack 12 is disposed on one side of the cup body 1, and the power jack 12 can be electrically connected to an external power source (for example a transformer, which is not numbered in the figures) for establishing electrical conduction with a socket (not shown). A motor 21 of the stirring device 2, a heating and cooling chip 3, and a heat sink fan 43 of a heat sink module 4 are electrically connected to the power jack 12. Further, an inner tank 13 is disposed in the cup body 1, and the inner tank 13 is made of a heat insulating material, which can keep the temperature of the liquid food after the liquid food is cooled or heated, so as to save the power for repeated cooling or heating. Thus, the objective of power saving is realized. In order to make the cup convenient to assemble, a base 14 is disposed under the cup body 1.

A stirring device 2 is disposed under the cup body and has a motor 21 and a stirring rod 22. A plurality of stirring blades 221 is disposed on the top of the stirring rod 22, the stirring rod 22 is power-connected to a driving shaft 211 of the motor 21, an end (stirring blades 221) of the stirring rod 22 is located in the cup body 1, for forcing the liquid food 5 in the cup body 1 to generate the convection. Further, the motor 21 of the stirring device 2 is electrically connected to the power jack 12. Moreover, the stirring rod 22 may be replaced by a stirring disc (not shown), which has the same effect of forced convection as the stirring rod 22 does.

A heating and cooling chip 3 is disposed under the stirring device 2. A side of the heating and cooling chip 3 abutting against the heat conductive block 11 of the cup body 1 is a contact surface 31, and the other side is a heat dissipation surface 32. The heating and cooling chip 3 can conduct the heat out of or into the cup body through the contact surface abutting against the heat conductive block 11 of the cup body 1, for coaling or heating the liquid food 5 in the cup body 1. The heating and cooling chip 3 is electrically connected to the power jack 12.

A heat sink module 4 is disposed under the heating and cooling chip 3, and has a heat conductive block 41, a heat sink fin 42, and a heat sink fan 43. An upper part of the heat conductive block 41 abuts against the heat dissipation surface 32 of the heating and cooling chip 3, and the heat sink fin 42 wraps the heat conductive block 41, for conducting the heat generated by the heating and cooling chip 3 during the temperature variation process to the heat sink fin 42 through the heat conductive block 41. The heat sink fan 43 is disposed under the heat sink fin 42, and the heat sink fan 41 is electrically connected to the power jack 12. After operation, the heat sink fan 41 can dissipate the heat accumulated on the heat sink fin 42. Further, the heat sink fan 43 of the heat sink module 4 is wrapped in a filter 44, so as to prevent the dust from entering the heat sink fan 43 and accumulating on it, thereby greatly improving the heat dissipation efficiency of the heating and cooling chip 3.

During assembly, the stirring device 2 and the heating and cooling chip 3 are assembled on the bottom of the cup body 1, and the heat sink module 4 is disposed on the bottom of the heating and cooling chip 3, such that one end (stirring blades 221) of the stirring rod 22 of the stirring device 2 is located in the cup body 1. The cup body 1 abuts against the contact surface 31 of the heating and cooling chip 3 through the heat conductive block 11, the heat sink module 4 abuts against the heat dissipation surface 32 of the heating and cooling chip 3 through the heat conductive block 41, and the power source is inserted into the power jack 12 for establishing the electrical conduction.

Figure 4:
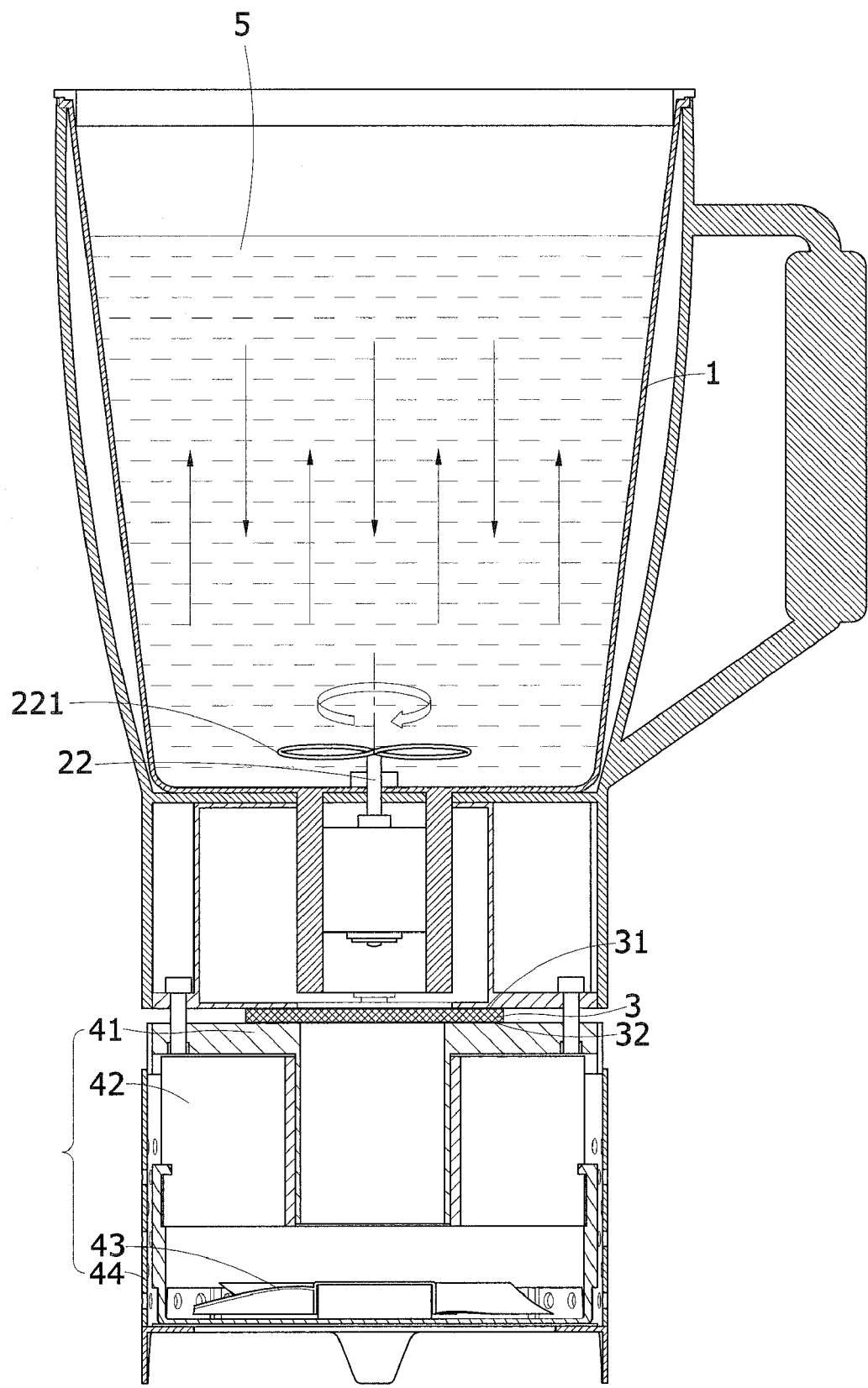
FIG. 4 is a schematic view of an application of the preferred embodiment of the present invention.

Referring to FIG. 4, when the present invention is used, the liquid food 5 is put in the cup body, the heating and cooling chip 3 begins to cool or heat the cup body 1, and the heat is conducted out of or into the cup body 1 through the heat conductive block 11 on the bottom of the cup body 1, such that the liquid food 5 in the cup body 1 is cooled or heated. During cooling or heating, the stirring device 2 and the heat sink module 4 work synchronously, and the liquid food 5 is forced to generate the to and fro rotary convection by the stirring blades 221 of the stirring rod 22, so as to accelerate the whole temperature variation process. Further, the heat sink module 4 absorbs the cold air through the heat sink fan 43, blows the cold air to the heat sink fin 42, and quickly dissipates the heat conducted to the heat sink fin 42 by the heating and cooling chip 3 through heat conductive block 41, so as to maintain the heat dissipation efficiency of the heating and cooling chip 3 and to ensure the normal operation of the chip.

As described above, during implementation, the present invention has the following advantages.

1. Referring to FIGS. 1 to 4, in the present invention, through the Peltier effect of the heating and cooling chip 3, when the power is on, heat release or heat absorption will occur to cool or heat the cup body 1. During the temperature variation process, the stirring device 2 stirs, such that the liquid food 5 in the cup body 1 generates the forced convection to accelerate the whole temperature variation process.

2. In the present invention, the heat sink module 4 is used, so as to increase the heat dissipation efficiency of the heating and cooling chip 3, thereby assuring the normal operation.

3. In the present invention, an inner tank 13 is disposed in the cup body 1, and the inner tank 13 is a heat insulating material, which keeps the temperature of the liquid food 5 after being cooled or heat, so as to prevent repeatedly cooling or heating to consume the power, thereby achieving the power saving objective.

The above description is only the preferred embodiment of the present invention, and is not used to limit the scope of the implementation of the present invention. For example, variations to the stirring device or the manners of disposing the heating and cooling chip are also within the scope of the present invention. Therefore, it will be apparent to those skilled in the art that various modifications and variations can be made to the structure of the present invention without departing from the scope or spirit of the invention.

To sum up, the heating and cooling cup of the present invention has the creativeness of the patent and the utility value on industry. The present application is filed for a utility model patent according to the law.

What is claimed is:

1. A heating and cooling cup, at least comprising:
   a cup body, wherein a heat conductive block is disposed under the cup body in a protruding manner, a power jack is disposed on one side of the cup body, a base is disposed under the cup body, and the heat conductive block is inserted in the base;
   a stirring device, disposed under the cup body, and having a motor and a stirring rod, wherein the stirring rod is power-connected to a driving shaft of the motor, the stirring rod is located in the cup body, and the motor of the stirring device is electrically connected to the power jack;
   a heating and cooling chip, disposed under the stirring device, wherein one surface abutting against the heat conductive block of the cup body is a contact surface, and the other side is a heat dissipation surface, the heating and cooling chip conducts the heat out of or into the cup body through the heat conductive block of the cup body, and the heating and cooling chip is electrically connected to the power jack; and
   a heat sink module, disposed under the heating and cooling chip, having a heat conductive block, a heat sink fin, and a heat sink fan, wherein an upper part of the heat conductive block abuts against the heat dissipation surface of the heating and cooling chip, the heat sink fin wraps the heat conductive block, the heat sink fan is disposed under the heat sink fin, and the heat sink fan is electrically connected to the power jack.

2. The heating and cooling cup according to claim 1, wherein the cup body has an inner tank disposed therein, and the inner tank is made of a heat insulating material.

3. The heating and cooling cup according to claim 1, wherein the power jack of the cup body establishes electrical conduction with a power source.

4. The heating and cooling cup according to claim 1, wherein the stirring rod has a plurality of stirring blades.

5. The heating and cooling cup according to claim 1, wherein the stirring rod is replaced by a stirring disc.

6. The heating and cooling cup according to claim 1, wherein the heat sink fan of the heat sink module is wrapped in a filter.

* * * * *